(12) United States Patent
Braun et al.

(10) Patent No.: US 7,850,112 B2
(45) Date of Patent: Dec. 14, 2010

(54) BELT RETRACTOR

(75) Inventors: Joachim Braun, Schechingen (DE); Volker Holzapfel, Wendel (DE)

(73) Assignee: TRW Automotive GmbH, Alfdorf (DE)

( * ) Notice: Subject to any disclaimer, the term of this patent is extended or adjusted under 35 U.S.C. 154(b) by 119 days.

(21) Appl. No.: 12/150,179

(22) Filed: Apr. 25, 2008

(65) Prior Publication Data
US 2008/0265080 A1 Oct. 30, 2008

(30) Foreign Application Priority Data
Apr. 27, 2007 (DE) .................. 10 2007 020 000

(51) Int. Cl.
B65H 75/48 (2006.01)
(52) U.S. Cl. .................. 242/379.1; 280/805
(58) Field of Classification Search ............ 242/374, 242/379.1; 297/476, 478; 280/805–807
See application file for complete search history.

(56) References Cited

U.S. PATENT DOCUMENTS

| 4,113,200 | A | * | 9/1978 | Tanaka ................. 242/372 |
| 5,511,741 | A | * | 4/1996 | Zolkower et al. ....... 242/381.1 |
| 5,522,564 | A |   | 6/1996 | Schmidt et al. |
| 5,895,002 | A |   | 4/1999 | Sasaki et al. |
| 6,105,893 | A |   | 8/2000 | Schmidt et al. |
| 6,290,159 | B1 | * | 9/2001 | Specht et al. .......... 242/379.1 |
| 6,412,875 | B1 | * | 7/2002 | Hibata et al. .......... 297/478 |
| 7,025,297 | B2 | * | 4/2006 | Bell et al. ............ 242/384 |
| 7,429,231 | B2 | * | 9/2008 | Bieg et al. ............ 475/331 |

FOREIGN PATENT DOCUMENTS

| DE | 4331027 | 3/1995 |
| DE | 19609524 | 9/1997 |
| DE | 19806483 | 8/1998 |
| DE | 29908598 | 10/1999 |
| WO | 2004048161 | 6/2004 |

* cited by examiner

Primary Examiner—Sang Kim
(74) Attorney, Agent, or Firm—Tarolli, Sundheim, Covell & Tummino LLP

(57) ABSTRACT

A belt retractor (10) includes a frame (12), a belt spool (14) being rotatably supported in the frame (12), a locking disc (16) being rotatably mounted on the belt spool (14), a load limiting element (18) being effective between the belt spool (14) and the locking disc (16), a holding element (20) being able to hold the locking disc (16) relative to the belt spool (14) so as to be locked against relative rotation, and a drive element (22) for the belt spool (14), the drive element (22) being rotatable to a limited extent relative to the belt spool (14) between an initial position in which the drive element (22) ensures that the holding element (20) holds the locking disc (16) relative to the belt spool (14) so as to be locked against relative rotation, and a release position in which the drive element (22) ensures that the holding element (20) frees the locking disc (16).

18 Claims, 8 Drawing Sheets

BELT RETRACTOR

TECHNICAL FIELD

The invention relates to a belt retractor.

BACKGROUND OF THE INVENTION

Belt retractors are generally known as components of occupant restraint systems. They generally comprise a load limiting element and optionally have a belt tensioner drive which tightens a safety belt of the occupant in case of an impending vehicle impact, by driving a belt spool of the belt retractor in the belt up-winding direction. The load limiting element makes a withdrawal of belt webbing possible in a locking position of the belt spool, in order to limit a physical stressing of the occupant.

If, in the case of restraint, the belt webbing has a belt slack, e.g. owing to a failure of the belt tensioner, a certain forward displacement of the occupant, for instance towards an instrument panel or a steering wheel, is already possible. So that the forward displacement of the occupant does not become too great, a release of belt webbing by the load limiter is frequently undesired in these restraint situations. The belt retractor should therefore not permit any load limitation, i.e. any withdrawal of belt webbing on the belt spool, for example in the case of a failure of a tensioning system which may be provided in the belt retractor, on a belt buckle or on an end fitting.

It is an object of the invention to provide a belt retractor with a load limiting function, the load limiter of the belt retractor being "connectable" only in predeterminable restraint situations, for example in restraint situations with belt tensioning.

BRIEF SUMMARY OF THE INVENTION

This is achieved by a belt retractor including a frame, a belt spool being rotatably supported in the frame, a locking disc being rotatably mounted on the belt spool, a load limiting element being effective between the belt spool and the locking disc, a holding element being able to hold the locking disc relative to the belt spool so as to be locked against relative rotation, and a drive element for the belt spool, the drive element being rotatable to a limited extent relative to the belt spool between an initial position in which the drive element ensures that the holding element holds the locking disc relative to the belt spool so as to be locked against relative rotation, and a release position in which the drive element ensures that the holding element frees the locking disc. In other words, the holding element bridges the load limiting element in the initial position of the drive element and prevents an effective load limitation. The load limiting element can be "connected" through the possible rotation of the drive element relative to the belt spool. This means, in concrete terms, that the locking disc and the belt spool are no longer held by the holding element so as to be locked against relative rotation in the release position of the drive element, but rather are only coupled by means of the load limiting element with respect to a relative rotation. As from a predeterminable belt webbing withdrawal force, i.e. a predeterminable torque between belt spool and locking disc, an unwinding of belt webbing is possible by means of the load limiting element, by the belt spool rotating relative to the fixed locking disc. As the drive element is rotatable only to a limited extent relative to the belt spool, it can drive the belt spool after the "connection" of the load limiting element, and can therefore carry out a belt tensioning.

The drive element and the locking disc are preferably arranged at opposite axial ends of the belt spool and the holding element extends from the drive element through a belt spool opening into a locking disc recess. A locking mechanism with locking disc and release sensors is therefore associated with one side of the belt spool, whilst a drive device for the drive element, for example a belt tensioner drive, is provided on the opposite side of the belt spool. As a result of this distribution, there are no problems regarding structural space on one side of the belt spool.

In one embodiment, the drive element has an opening with a rim, the holding element extending through the opening and the holding element being constructed as a holding pin having a pin head, said pin head lying against the rim of the opening. Owing to this pin-shaped construction with a pin head, a movement of the holding element in the axial direction of the pin is possible in a particularly simple manner.

In this embodiment, the opening in the drive element is preferably constructed as an elongated hole with a chamfered hole rim, so that the pin head of the holding element can slide on the chamfered hole rim on a rotation of the drive element relative to the belt spool. Thereby, the limited rotatability between drive element and belt spool is utilized with minimal effort, in order to move the holding element in an axial direction. As a result of this axial movement, the holding element no longer holds the locking disc on the belt spool so as to be locked against relative rotation, but rather releases the locking disc.

In another variant embodiment, a spring element is provided, which acts upon the holding element against the drive element, so that with a rotation of the drive element relative to the belt spool, the holding element can slide on the drive element.

In this variant embodiment, the drive element preferably has an opening, the holding element engaging the opening in the release position of the drive element. As an alternative to the elongated hole with chamfered hole rim which is indicated above, in this embodiment a relative rotation of the drive element relative to the belt spool is likewise converted with minimal effort into a linear movement of the holding element in the axial direction. As a result of this linear movement, the holding element no longer holds the locking disc relative to the belt spool so as to be locked against relative rotation, but rather releases the locking disc.

The drive element may have a stop pin which engages the belt spool in the release position of the drive element. After a relative rotation between drive element and belt spool has been completed, this stop pin ensures a reliable entrainment of the belt spool so that the drive element and the belt spool continue to rotate together, for example for the purpose of belt tensioning.

The drive element is preferably part of a pyrotechnic drive. Pyrotechnic drives generally have a very short reaction time, so that a load limitation can be quickly connected in an emergency. Particularly in the use of buckle tensioners or end fitting tensioners, the pyrotechnic drive is generally separate, i.e. is constructed independently of the tensioner drive, and merely moves the drive element from the initial position into the release position when it is activated.

However, the drive element may also be part of a belt tensioner drive for a retractor tensioner. In this case, connection of the load limitation is simply effected by activating the belt tensioner. This is particularly advantageous, because during a belt tensioning, a belt load limitation is generally desired, whereas on omission of a belt tensioning, a load limitation may be undesired, in order to prevent too great a forward displacement of the occupant. Of course, in other embodiments, the drive element may also be driven independently of a belt tensioner.

In a further embodiment, the holding element is part of a load limiting arrangement. As the holding element assumes a dual function in this case, the construction of the belt tensioner is simplified. In addition, the number of individual components is reduced.

In concrete terms, the holding element may be constructed as a spindle and the load limiting element may be constructed as a spindle nut cooperating with the spindle. The dual function of the holding element now consists in that on the one hand the spindle, in an initial position, holds the locking disc relative to the belt spool so as to be locked against relative rotation, and in a release position frees the locking disc (e.g. by a movement of the spindle in an axial direction) and on the other hand the spindle, with a rotation of the spindle about its spindle shaft, drives the load limiting element for the purpose of belt load limitation.

DETAILED DESCRIPTION OF THE PREFERRED EMBODIMENTS

Figure 1:
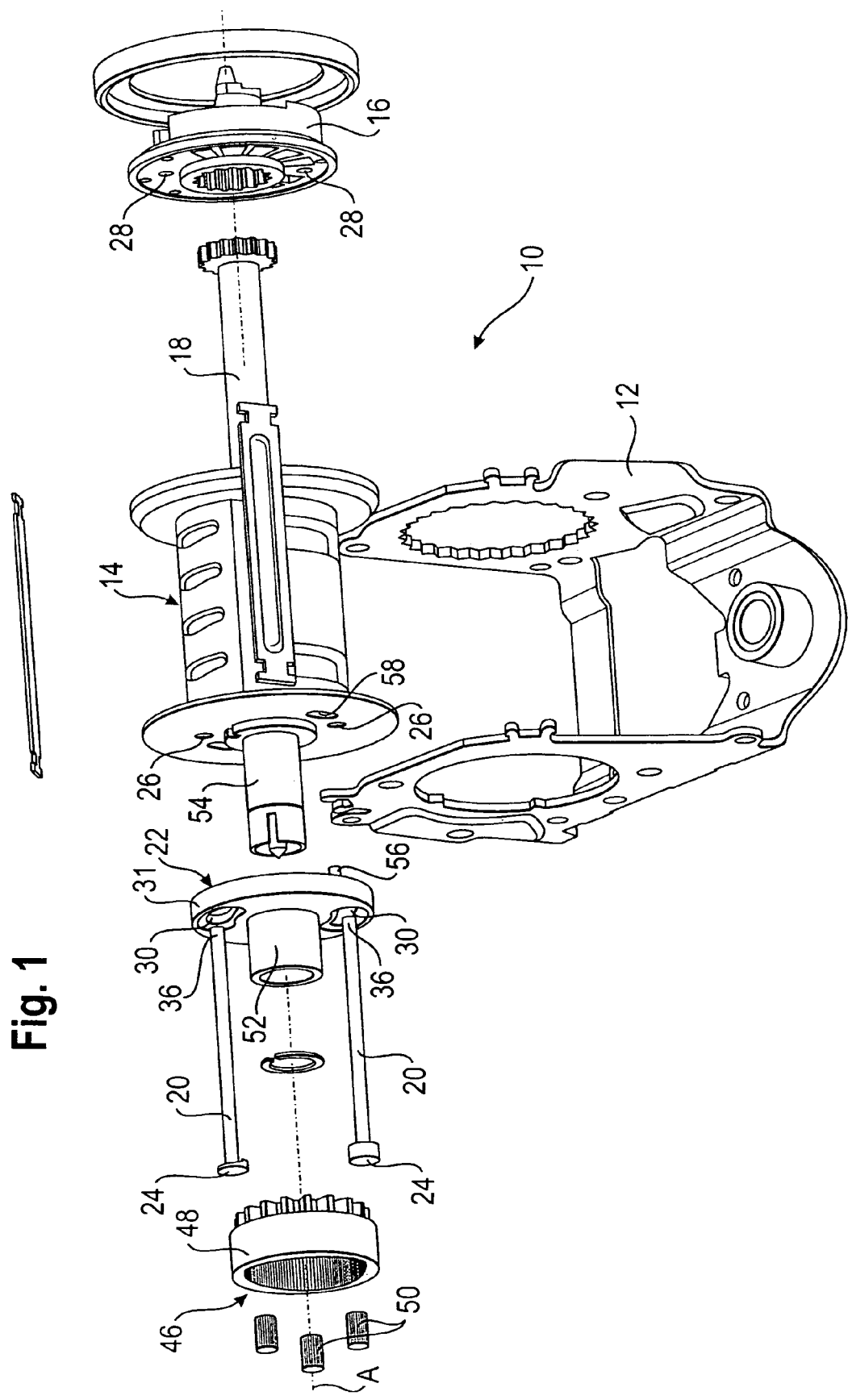
FIG. 1 shows a perspective exploded view of a belt retractor according to the invention in accordance with a first embodiment.
Figure 2:
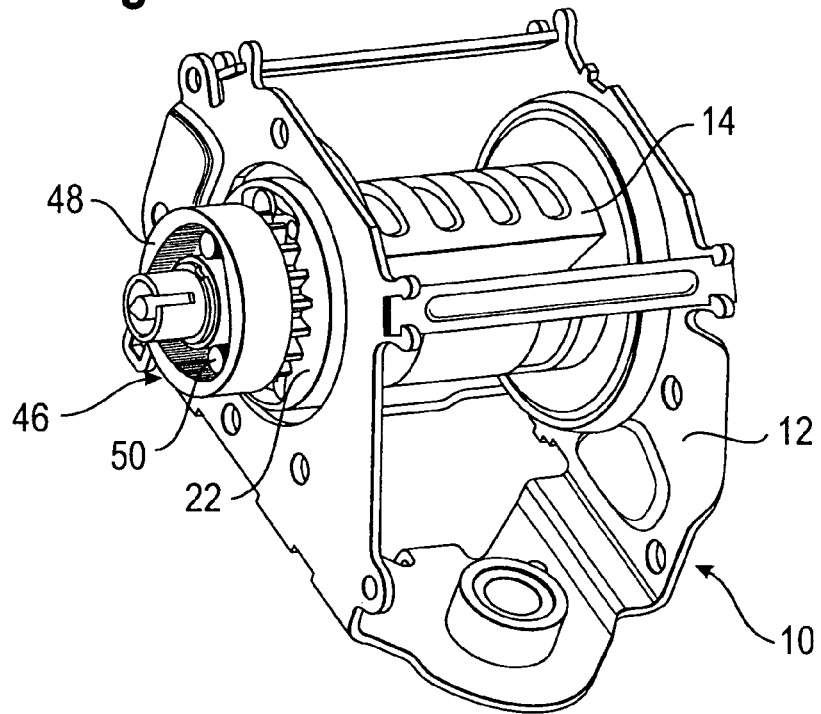
FIG. 2 shows a perspective view of the belt retractor according to FIG. 1 in the assembled state.
Figure 3:
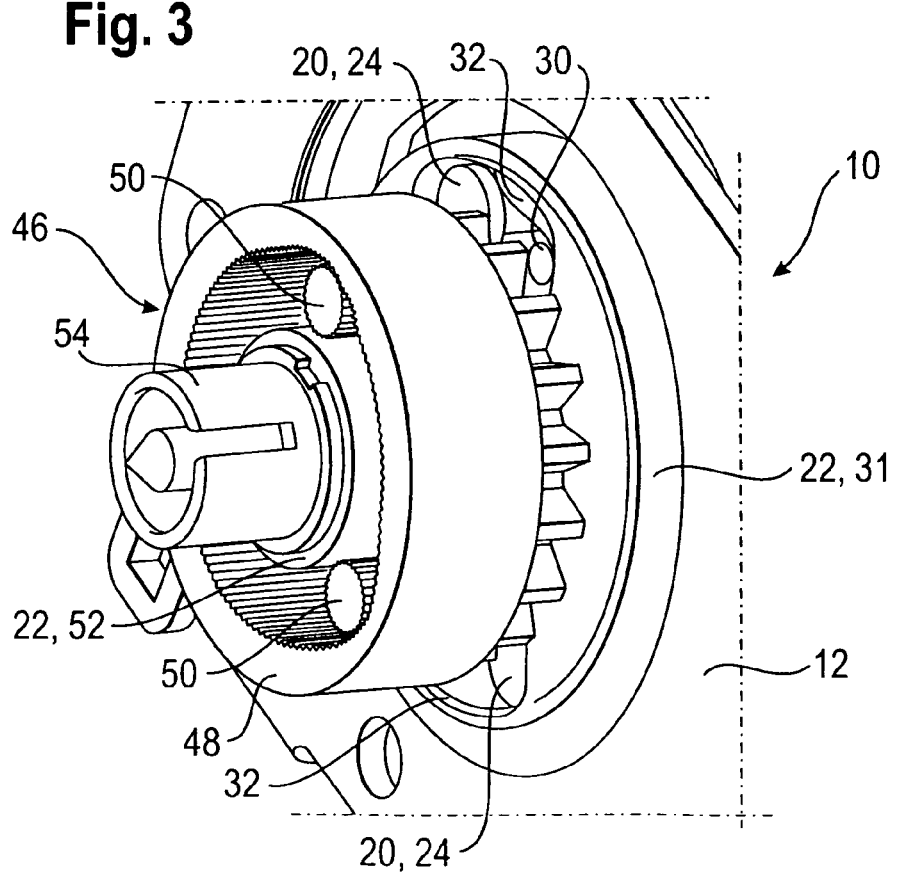
FIG. 3 shows a perspective detail view of the belt retractor according to FIG. 2.

FIGS. 1 to 3 show a belt retractor 10 in accordance with a first embodiment. The belt retractor 10 includes a frame 12, a belt spool 14 which is rotatably supported in the frame 12, a locking disc 16 which is rotatably mounted on the belt spool 14, a load limiting element 18 which is constructed here as a torsion bar and is effective between the belt spool 14 and the locking disc 16, two holding elements 20 which can hold the locking disc 16 relative to the belt spool 14 so as to be locked against relative rotation, and a drive element 22 for the belt spool 14. The drive element 22 is rotatable to a limited extent relative to the belt spool 14 between an initial position in which the drive element 22 ensures that the holding elements 20 hold the locking disc 16 relative to the belt spool 14 so as to be locked against relative rotation, and a release position in which the drive element 22 ensures that the holding elements 20 free the locking disc 16.

The drive element 22 and the locking disc 16 are arranged at opposite axial ends of the belt spool 14. The holding elements 20 are constructed as holding pins with a pin head 24 and extend from the drive element 22 through belt spool openings 26 into locking disc recesses 28.

In the first embodiment according to FIGS. 1 to 5, the drive element 22 has openings 30, a holding element 20 being constructed as a holding pin extending through each opening 30, the pin head 24 of the holding element 20 lying against a rim 32 of the opening 30 on a side of the drive element 22 facing away from the belt spool 14. The openings 30 are formed in a disc-shaped section 31 of the drive element 22 respectively as an elongated hole with a chamfered hole rim 32 (FIG. 4), each elongated hole extending in a peripheral direction with respect to a retractor axis A.

Figure 4:
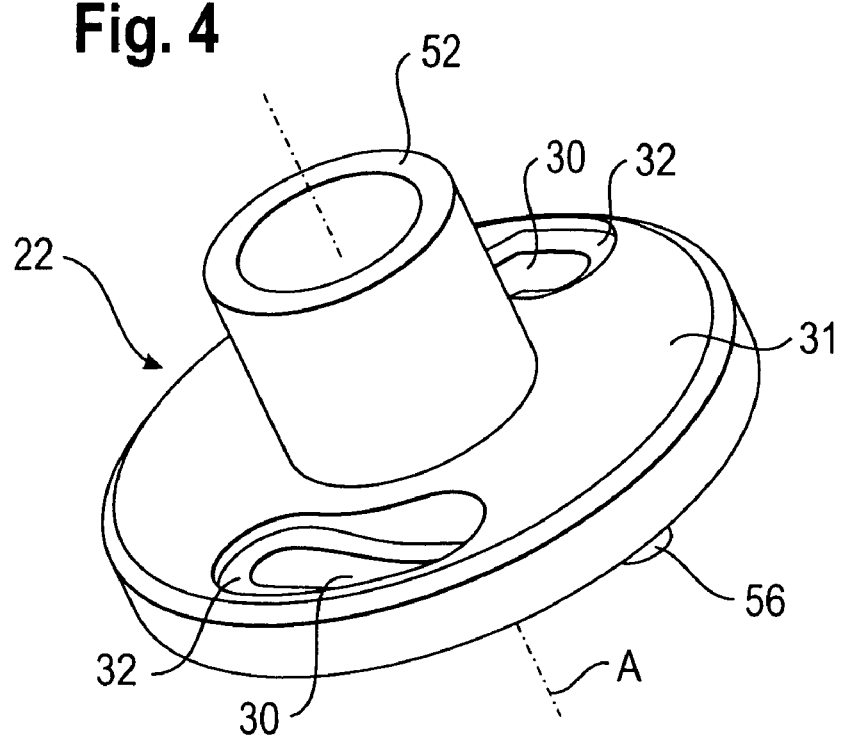
FIG. 4 shows a perspective detail view of a drive element of the belt retractor in accordance with the first embodiment.

FIG. 4 shows the drive element 22 with its openings 30 in detail, each opening 30 being constructed as an elongated hole. The hole rim 32 is designated as a chamfered hole rim 32, because it extends to a variably far extent into the disc-shaped section 31 of the drive element 22 with respect to the retractor axis A, viewed in a longitudinal direction of the elongated hole. With a pin head 24 of the holding element 20 lying against the hole rim 32, and with a rotation of the drive element 22 relative to the holding element 20, the pin head 24 slides on the chamfered hole rim 32 so that the holding element 20 carries out a movement parallel to the retractor axis A owing to the inclination of the hole rim 32.

Figure 5:
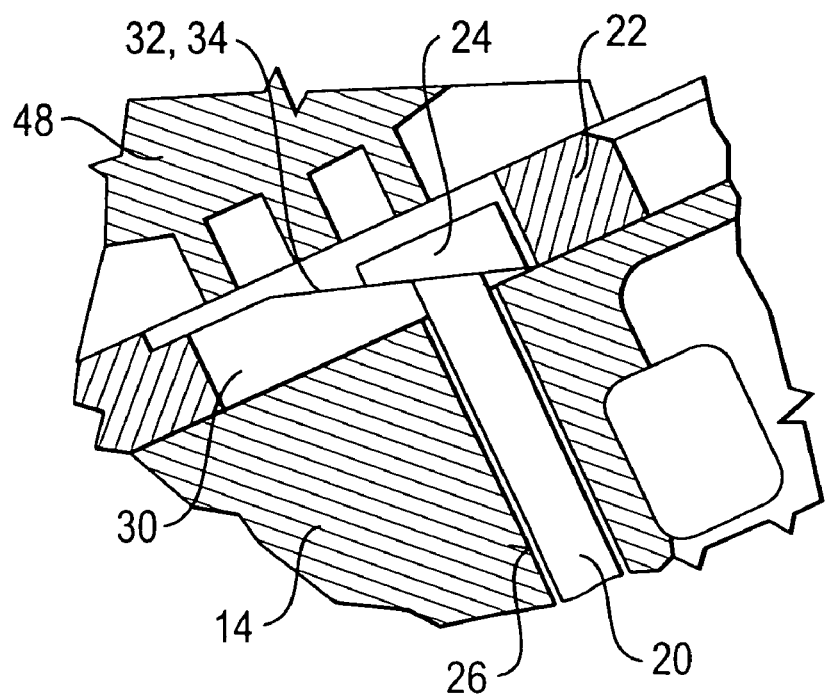
FIG. 5 shows a detail section through the belt retractor according to the invention in accordance with the first embodiment.

For clarification, a detail section along an elongated hole opening 30 in the assembled state of the belt retractor 10 is illustrated in FIG. 5, in which the pin head 24 of the pin-shaped holding element 20 lies against the chamfered hole rim 32. In FIG. 5, the drive element 22 is in an initial position in which the pin head 24, viewed in the direction of the retractor axis A, is closest to the belt spool 14. As a result of a relative rotation between the drive element 22 and the belt spool 14, the pin head 24 slides on a ramp 34 of the chamfered hole rim 32, so that the pin-shaped holding element 20 is pulled out of the associated belt spool opening 26, with the pin head 24 moving away from the belt spool 14. Through this movement of the holding element 20 parallel to the retractor axis A, the end 36 of the pin-shaped holding element 20, opposite the pin head 24, is pulled out of the locking disc recess 28 (cf. FIG. 1), such that the holding element 20 no longer holds the locking disc 16 and the belt spool 14 so as to be locked against relative rotation relative to each other. The holding element 20 frees the locking disc 16, with the locking disc 16 being able to be in fact still fixed on the frame 12 by a locking mechanism, but the belt spool 14 (together with the holding elements 20) now being rotatable relative to the locking disc 16 and therefore relative to the frame 12. The belt spool 14 and the locking disc 16 are now only coupled by the load limiting element 18, which establishes the necessary belt webbing load for such a relative rotation.

In an analogous manner to FIGS. 1 to 5, FIGS. 6 to 10 show the belt retractor 10 in accordance with a second embodiment. The fundamental structure and function of the belt retractor 10 is identical here to the structure and mode of operation of the previously described belt retractor 10 according to FIGS. 1 to 5. The essential difference lies in an altered embodiment of the drive element 22 and altered pin heads 24 of the pin-shaped holding elements 20.

Figure 9:
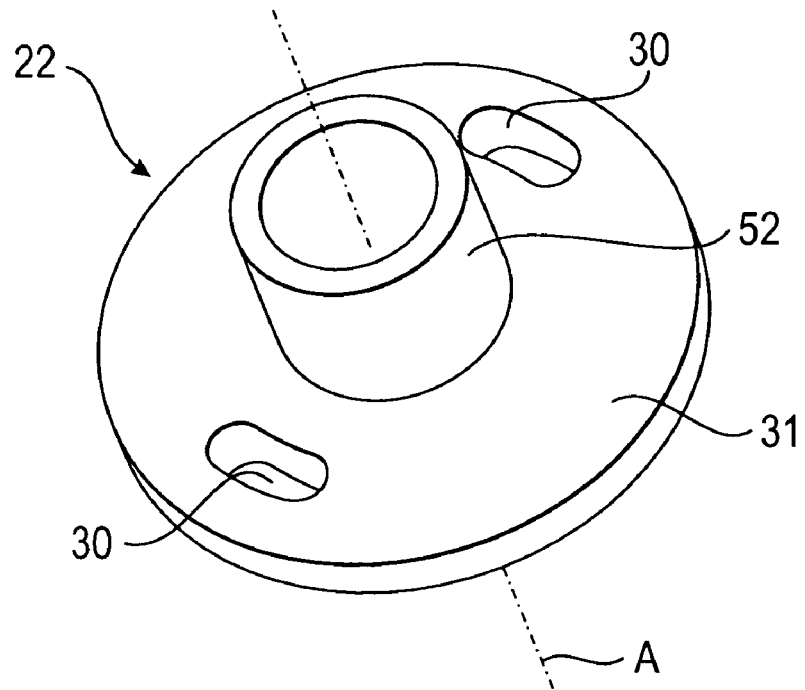
FIG. 9 shows a perspective detail view of a drive element of the belt retractor in accordance with the second embodiment.

FIG. 9 shows the altered drive element 22 in detail, in which it is immediately apparent that the openings 30 do not have a chamfered hole rim 32 as in the first embodiment (cf. FIG. 4).

Figure 6:
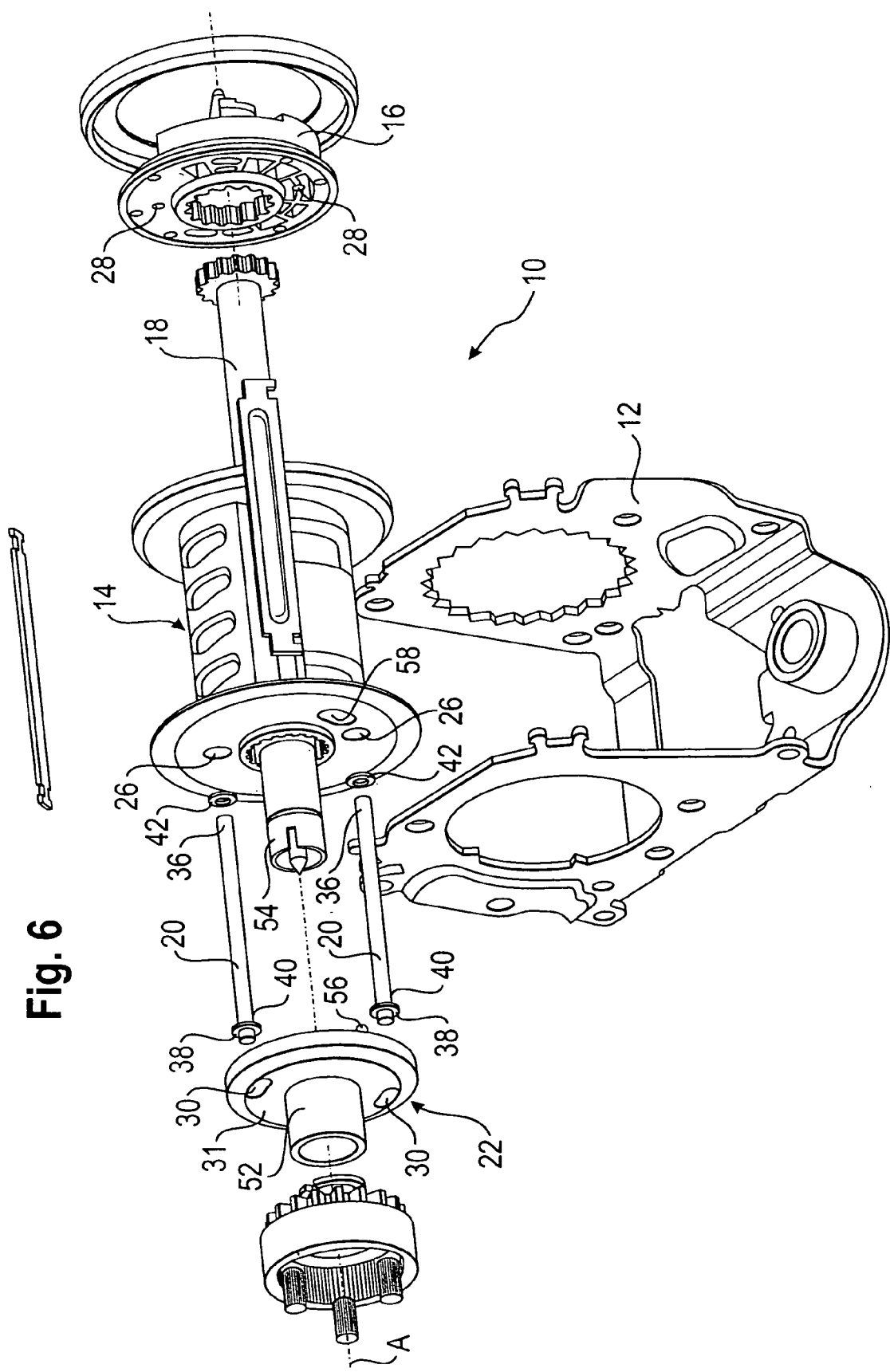
FIG. 6 shows a perspective exploded view of the belt retractor according to the invention in accordance with a second embodiment.
Figure 7:
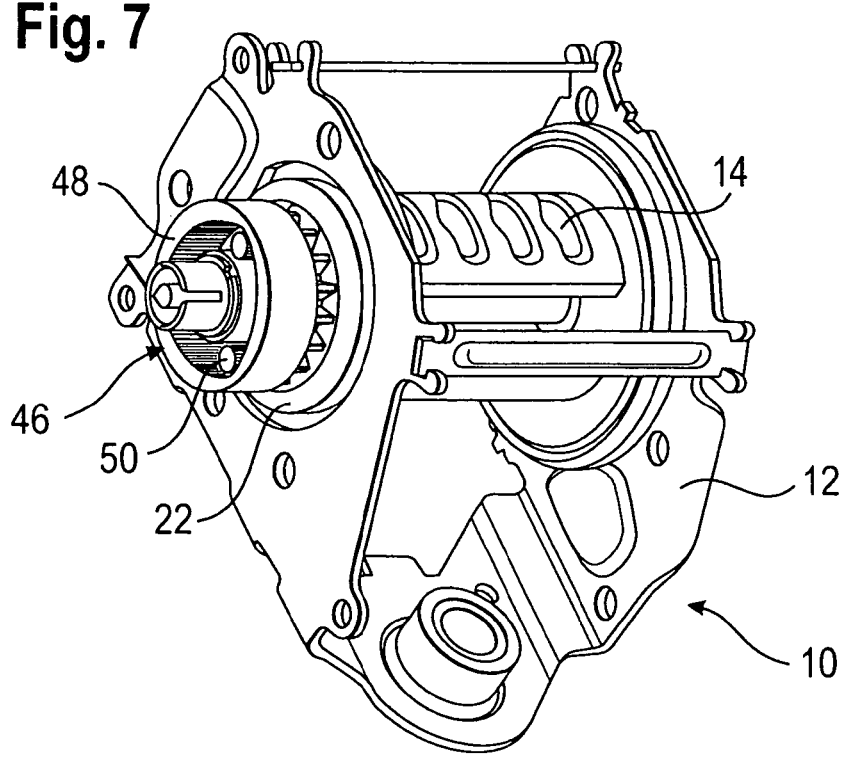
FIG. 7 shows a perspective view of the belt retractor according to FIG. 6 in the assembled state.
Figure 8:
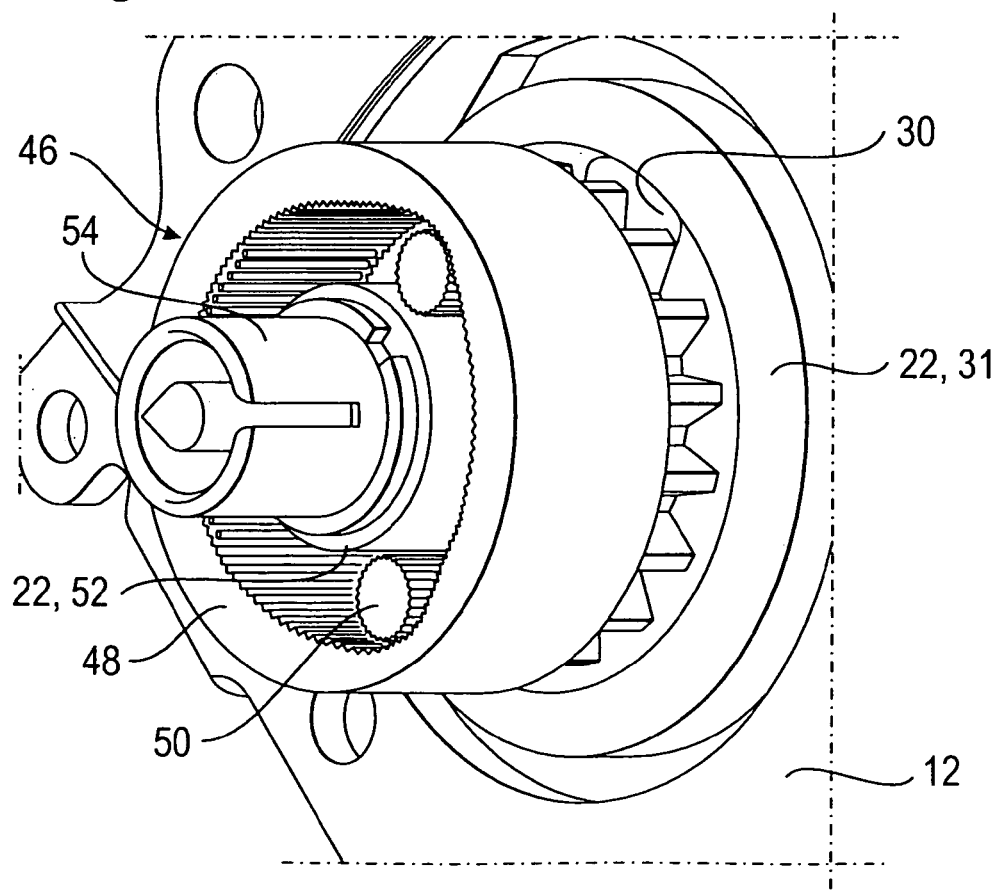
FIG. 8 shows a perspective detail view of the belt retractor according to FIG. 7.

In contrast to the first embodiment, the pin-shaped holding element 20 according to FIG. 6 also does not have a pin head 24 in accordance with FIG. 1, but rather an encircling projection 38 in the region of a pin end 40 adjacent to the drive element 22.

Figure 10:
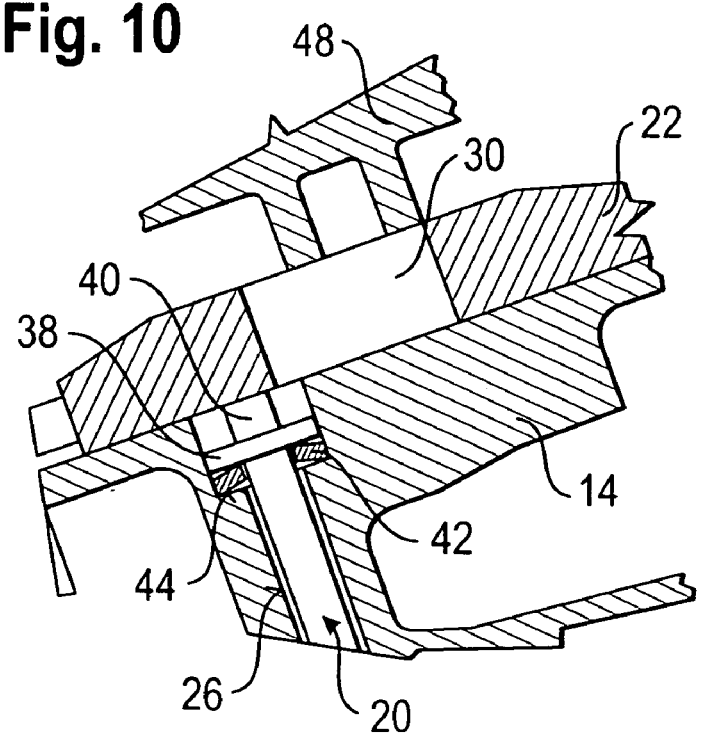
FIG. 10 shows a detail section through the belt retractor according to the invention in accordance with the second embodiment.

FIG. 10 shows a detail section through the assembled belt retractor 10 in accordance with the second embodiment in the contact region between the holding element 20 and the drive element 22. In this figure, it becomes clear that the channel-shaped belt spool opening 26 for receiving the pin-shaped holding element 20 is widened at its end facing the drive element 22, so that the entire pin end 40 together with the projection 38 can be received in this widened end of the belt spool opening 26. A spring element 42, more precisely a plate spring, is provided between the projection 38 of the holding element 20 and the belt spool 14, which plate spring acts upon the holding element 20 in the direction of the drive element 22. The plate spring rests on the one hand against a shoulder 44 of the belt spool opening 26 and on the other hand against the encircling projection 38 of the holding element 20.

In an initial position of the drive element (FIG. 10), the drive element 22 prevents a movement of the holding element 20 in the direction of the retractor axis A. With a rotation of the drive element 22 relative to the belt spool 14 into its release position, the pin end 40 slides on the disc-shaped section 31 of the drive element 22 until the opening 30 in the drive element 22 is reached. Then the pin end 40 snaps into the opening 30 owing to the spring impingement upon the pin-shaped holding element 20, whereby again the opposite pin end 36 moves out of the locking disc recess 28, so that the holding element 20 frees the locking disc 16. As a result of this freeing of the locking disc 16, a belt webbing load is established by the load limiting element 18 which couples the belt spool 14 with the locking disc 16, as from which the belt spool 14 can turn relative to the locking disc 16 being fixed on the frame 12.

The drive element 22 is part of a discretionary drive unit which in some variant embodiments serves exclusively for the movement of the holding elements 20 in the axial direction for connecting or activating a load limitation. However, in particularly preferred variant embodiments, the drive unit is a belt tensioner drive which provides both for a belt tensioning and also for the connection of the belt load limitation. In other words, the belt tensioning in this case is the prerequisite that a load limitation is possible. In the previously described embodiments, the drive element 22 is coupled with a belt tensioner (not shown) by means of a grip roller clutch 46 (cf. in particular FIGS. 1, 3, 6 and 8). The grip roller clutch 46 has a ring gear 48 as well as grip rollers 50 housed in the ring gear 48, and cooperates in a known manner with a sleeve-shaped extension 52 of the drive element 22. On up-winding or unwinding belt webbing without activated belt tensioning, the locking disc 16 and the drive element 22 rotate together with the belt spool 14, the locking disc 16 and the belt spool 14 being connected by the holding elements 20 so as to be locked against relative rotation. The belt spool 14 is held so as to be locked against relative rotation with the drive element 22 by a light interference fit or clamping between the sleeve-shaped extension 52 of the drive element 22 and a belt spool extension 54. Alternatively, shear-off knobs (not shown) can be provided, which connect the drive element 22 with the belt spool 14 so as to be locked against relative rotation under low stresses, and shear off at a predetermined stress. The sleeve-shaped extension 52 rotates freely within the ring gear 48 without being in connection with the grip rollers 50.

When a belt tensioning takes place, the ring gear 48 is driven and, owing to its non-circular inner contour, acts upon the grip rollers 50 against the sleeve-shaped extension 52 of the drive element 22, so that the drive element 22 rotates together with the ring gear 48. In order to be able to transfer particularly high forces via the grip roller clutch 46, an inner side of the ring gear 48 and the grip rollers 50 are formed with teeth. The drive element 22 for the belt spool 14 is rotatable to a limited extent relative to the belt spool 14 and moves firstly from an initial position, in which it ensures that the holding element 20 holds the locking disc 16 relative to the belt spool 14 so as to be locked against relative rotation, into a release position in which it ensures that the holding element 20 frees the locking disc 16. Therefore, a load limitation in the belt retractor 10 is already made possible at the start of the belt tensioning. On further rotation of the drive element 22, the drive element 22 and the belt spool 14 are coupled so as to be locked against relative rotation by means of the holding elements 20 in the belt up-winding direction, so that the belt spool 14 co-rotates for the desired tensioning of the belt webbing. In FIGS. 1 and 6 at least one stop pin 56 is provided on a side of the drive element 22 facing the belt spool 14, which stop pin 56 moves during the relative rotation between the drive element 22 and the belt spool 14 in an elongated hole belt spool recess 58, and engages the belt spool 14 in the release position of the drive element 22. This stop pin 56 promotes a reliable force transmission between the drive element 22 and the belt spool 14 in the case of a belt tensioning. The bearing stress in the hole walls of the openings 30 in the drive element 22 is thereby reduced.

Figure 11:
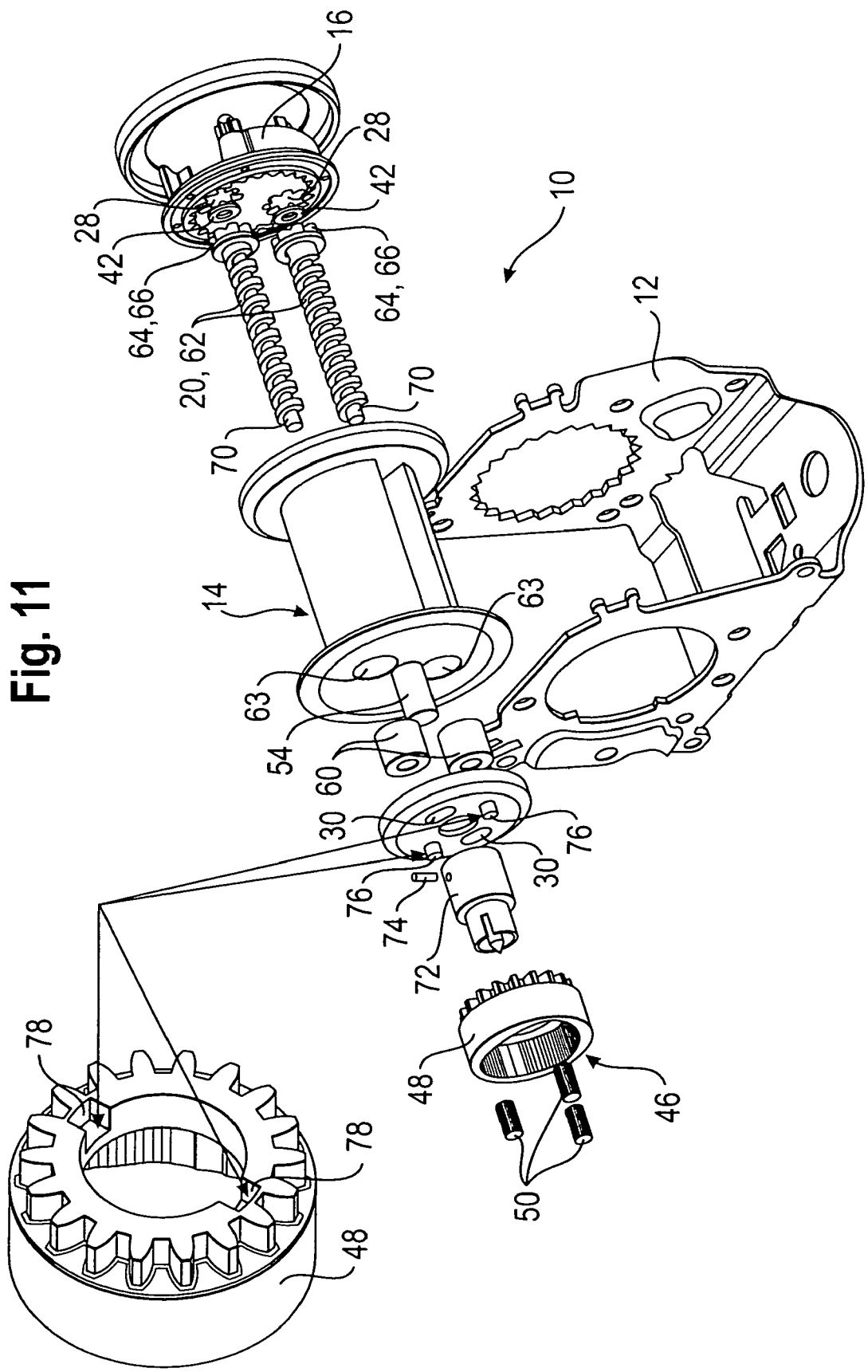
FIG. 11 shows a perspective exploded view of the belt retractor according to the invention in accordance with a third embodiment.
Figure 12:
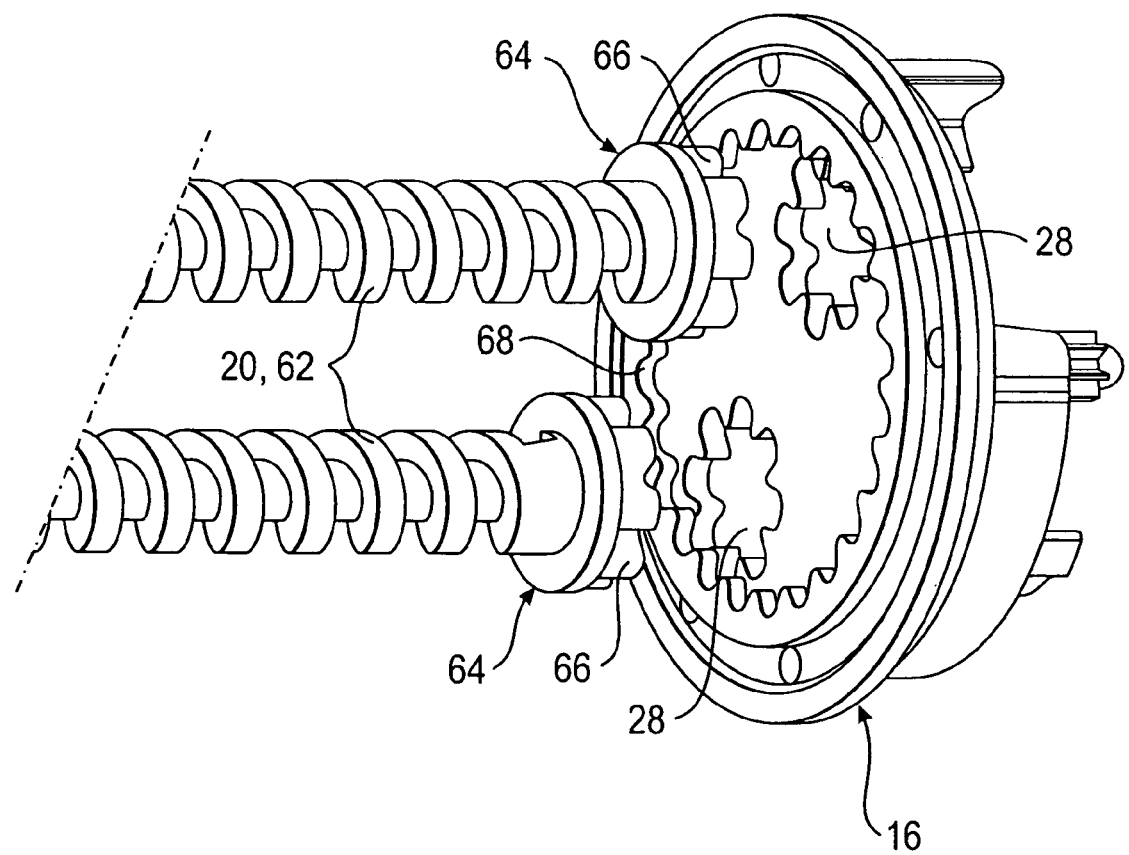
FIG. 12 shows a perspective detail view of the belt retractor in accordance with the third embodiment.

FIGS. 11 and 12 show a third embodiment of the belt retractor 10, in which two spindle nuts 60 are provided as load limiting elements, instead of a torsion rod. With a rotation of the spindles 62 about their spindle axis, the spindle nuts 60 are moved through the respectively associated belt spool openings 26, deforming or removing belt spool material on the walls of the belt spool openings 26, for load limitation. The spindle nuts 60, the spindles 62 and the belt spool openings 26 form here a load limitation arrangement.

In this third embodiment, the spindles 62, as part of the load limitation arrangement, also undertake the function of the previously described pin-shaped holding elements 20, so that additional holding elements 20 can be dispensed with. The spindles 62 have outer teeth 66 respectively at a first axial spindle end 64, which mesh with inner teeth 68 of the locking disc 16 (cf. also FIG. 12). In an analogous manner to the second embodiment, the holding elements 20 being constructed as spindles 62 are acted upon by spring elements 42 against the drive element 22. The spring elements 42 engage here respectively on the first axial spindle end 64, rest against the locking disc 16 and are housed in the locking disc recesses 28. In the initial position of the drive element 22, the first axial spindle ends 64 extend into the locking disc recesses 28, with the outer teeth 66 of the spindles 62 engaging with a form fit into the locking disc recesses 28. The spindle nuts 60 are turned so far onto the spindles 62 that a second axial spindle end 70 projects and lies against the drive element 22, whereby an axial movement of the spindles 62 towards the grip roller clutch 46 is prevented. As long as the spindles 62 engage into the locking disc recesses 28, with the locking disc 16 being fixed on the frame 12, a rotation of the belt spool 14 and hence a withdrawal of belt webbing for the purpose of load limitation is not possible.

If the drive element 22 is rotated relative to the belt spool 14 into its release position, the second axial spindle ends 70 slide on the drive element 22 until the openings 30 in the drive element 22 are reached. Then the second axial spindle ends 70 snap into the openings 30 owing to the spring impingement upon the spindles 62, and the opposite first axial spindle ends 64 move out of the locking disc recesses 28. The spindles 62 thereby free the locking disc 16 in the release position of the drive element 22, so that now with the locking disc 16 being fixed on the frame 12, a rotation of the belt spool 14 is possible. With such a rotation of the belt spool 14, the spindles 62 rotate respectively about their spindle axes, because the outer teeth 66 of the spindles 62 and the inner teeth 68 of the locking disc 16 are still in meshing engagement. The spindle nuts 60 are moved by the spindles 62 on their rotation about their spindle shaft in axial direction through the belt spool openings 26, deforming or removing belt spool material on the walls of the belt spool openings 26 for load limitation.

Reference is to be made to the description of the first two embodiments with regard to the general function of the belt retractor 10. Only a special characteristic of the belt retractor 10 in the third embodiment is described in detail below.

In contrast to the first and second embodiments, instead of a sleeve-shaped extension 52 formed in one piece with the drive element 22, a separate sleeve piece 72 is provided which, in the mounted state, is connected with the belt spool extension 54 by a holding pin 74 so as to be locked against relative rotation. In FIG. 11, the drive element 22 is constructed substantially in a disc shape and has two formed-on pins 76 on a side facing the ring gear 48, which pins 76 engage with a form fit in ring gear recesses 78 in the mounted state. When the ring gear 48 is driven, it directly rotates the drive element 22 via the connection between the pins 76 and the ring gear recesses 78 and moves the grip rollers 50 at the same time towards the sleeve piece 72. A certain relative rotation between the drive element 22 and the belt spool 14 takes place until the grip rollers 50 are positioned so that they transfer the rotation of the ring gear 48 via the sleeve piece 72 onto the belt spool 14 for the purpose of belt tensioning. This relative rotation is preferably approximately 15° and is sufficient to move the drive element 22 from its initial position into its release position and therefore to activate a belt load limitation.

The invention claimed is:

1. A belt retractor including
a frame (12),
a belt spool (14) being rotatably supported in said frame (12),
a locking disc (16) being rotatably mounted on said belt spool (14),
a load limiting element (18) being effective between said belt spool (14) and said locking disc (16),
a holding element (20) being able to hold said locking disc (16) relative to said belt spool (14) so as to be locked against relative rotation, and
a drive element (22) for said belt spool (14), said drive element (22) being rotatable to a limited extent relative to said belt spool (14) between an initial position in which said drive element (22) ensures that said holding element (20) holds said locking disc (16) relative to said belt spool (14) so as to be locked against relative rotation, and a release position in which said drive element (22) ensures that said holding element (20) frees said locking disc (16).

2. The belt retractor according to claim 1, wherein said belt spool (14) has a belt spool opening (26) and said locking disc (16) has a locking disc recess (28), said drive element (22) and said locking disc (16) being arranged at opposite axial ends of said belt spool (14) and said holding element (20) extending from said drive element (22) through said belt spool opening (26) into said locking disc recess (28).

3. The belt retractor according to claim 1, wherein a spring element (42) is provided, said spring element (42) acting upon said holding element (20) against said drive element (22), so that said holding element (20) can slide on said drive element (22) on a rotation of said drive element (22) relative to said belt spool (14).

4. The belt retractor according to claim 3, wherein said drive element (22) has an opening (30), said holding element (20) engaging said opening (30) in said release position of said drive element (22).

5. The belt retractor according to claim 1, wherein said drive element (22) has a stop pin (56), said stop pin (56) engaging said belt spool (14) in said release position of said drive element (22).

6. The belt retractor according to claim 1, wherein said drive element (22) is part of a pyrotechnic drive.

7. The belt retractor according to claim 1, wherein said drive element (22) is part of a belt tensioner drive.

8. The belt retractor according to claim 1, wherein said holding element (20) is part of a load limiting arrangement.

9. The belt retractor according to claim 1, wherein said holding element (20) is constructed as a spindle (62) and said load limiting element (18) is constructed as a spindle nut (60) cooperating with said spindle (62).

10. The belt retractor according to claim 1 further comprising a separate drive unit that is activated to bring said drive element into said release position in which said drive element ensures that said holding element frees said locking disc.

11. The belt retractor according to claim 1, wherein rotation of said drive element causes said holding element to move from a first position preventing relative rotation between said locking disc and said belt spool to a second position allowing relative rotation between said locking disc and said belt spool.

12. The belt retractor according to claim 11, wherein said holding element moves from said first position to said second position in a direction extending parallel to a central axis of said retractor.

13. The belt retractor according to claim 11, wherein said holding element moves relative to the entire locking disc from said first position to said second position.

14. The belt retractor according to claim 1, wherein said drive element engages said holding element when said drive element is in the initial position such that said holding element holds said locking disc relative to said belt spool so as to be locked against relative rotation.

15. The belt retractor according to claim 1, wherein said holding element is able to hold said locking device relative to said belt spool so as to prevent load limitation.

16. The belt retractor according to claim 1, wherein the entire locking disc is rotatable relative to said holding element from said initial position to said release position.

17. A belt retractor including
a frame (12),
a belt spool (14) being rotatably supported in said frame (12),
a locking disc (16) being rotatably mounted on said belt spool (14),
a load limiting element (18) being effective between said belt spool (14) and said locking disc (16),
a holding element (20) being able to hold said locking disc (16) relative to said belt spool (14) so as to be locked against relative rotation, and
a drive element (22) for said belt spool (14), said drive element (22) being rotatable to a limited extent relative to said belt spool (14) between an initial position in which said drive element (22) ensures that said holding element (20) holds said locking disc (16) relative to said belt spool (14) so as to be locked against relative rotation, and a release position in which said drive element (22) ensures that said holding element (20) frees said locking disc (16), said drive element (22) having an opening (30) with a rim (32), said holding element (20) extending through said opening (30) and said holding element (20) being constructed as a holding pin having a pin head (24), said pin head (24) lying against said rim (32) of said opening (30).

18. A belt retractor including a frame (12), a belt spool (14) being rotatably supported in said frame (12), a locking disc (16) being rotatably mounted on said belt spool (14), a load limiting element (18) being effective between said belt spool (14) and said locking disc (16), a holding element (20) being able to hold said locking disc (16) relative to said belt spool (14) so as to be locked against relative rotation, and a drive element (22) for said belt spool (14), said drive element (22) being rotatable to a limited extent relative to said belt spool (14) between an initial position in which said drive element (22) ensures that said holding element (20) holds said locking disc (16) relative to said belt spool (14) so as to be locked against relative rotation, and a release position in which said drive element (22) ensures that said holding element (20) frees said locking disc (16), said drive element (22) having an opening (30) with a rim (32), said holding element (20) extending through said opening (30) and said holding element (20) being constructed as a holding pin having a pin head (24), said pin head (24) lying against said rim (32) of said opening (30), said opening (30) in said drive element (22) being formed as an elongated hole with a chamfered hole rim (32), so that said pin head (24) of said holding element (20) can slide on said chamfered hole rim (32) on a rotation of said drive element (22) relative to said belt spool (14).

* * * * *